(No Model.)

J. C. MORRIS.
HANDLE ATTACHMENT FOR GLASS BOTTLES AND JARS.

No. 250,276. Patented Nov. 29, 1881.

Witnesses:
Harry Drury
Harry Smith

Inventor:
J. Cheston Morris
by his Attorneys
Howson and Son

UNITED STATES PATENT OFFICE.

J. CHESTON MORRIS, OF PHILADELPHIA, PENNSYLVANIA.

HANDLE ATTACHMENT FOR GLASS BOTTLES AND JARS.

SPECIFICATION forming part of Letters Patent No. 250,276, dated November 29, 1881.

Application filed July 29, 1881. (No model.)

*To all whom it may concern:*

Be it known that I, J. CHESTON MORRIS, a citizen of the United States, residing in Philadelphia, Pennsylvania, have invented an Improved Handle Attachment for Bottles and Jars, of which the following is a specification.

The main object of my invention is to make a handle which can be readily applied to and detached from a threaded bottle or jar, a further object being to combine such a handle with a lip or spout, whereby the contents of the bottle or jar can be poured out without spilling or dripping.

Figure 1:
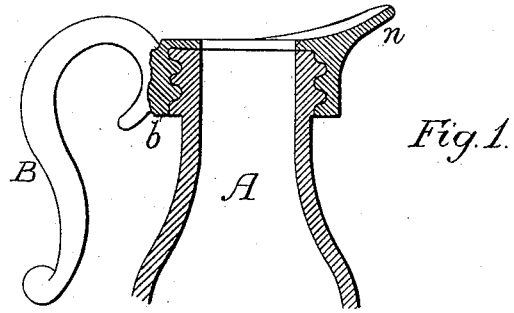
Figure 2:
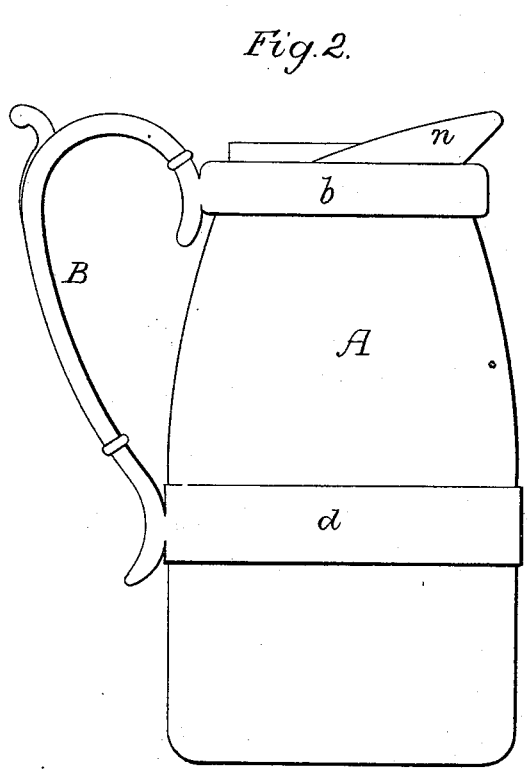
Figure 3:
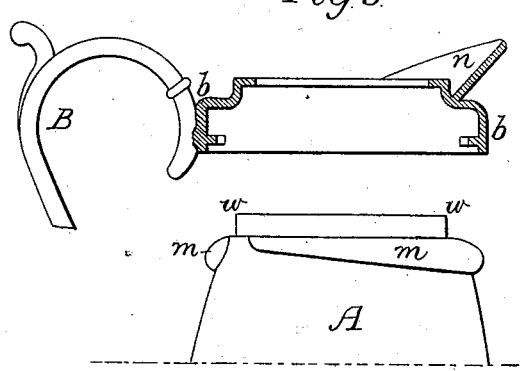
Figure 4:
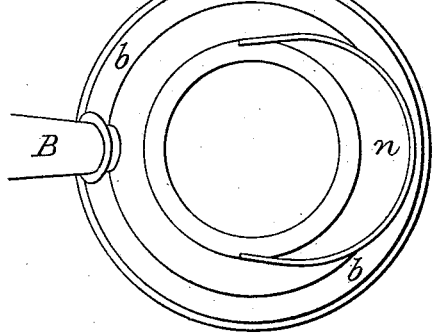

In the accompanying drawings, Figure 1 is a view of part of a bottle with the handle attachment; Fig. 2, a view of a fruit-jar with the attachment; Fig. 3, part of Fig. 2, showing the screw-ring in section and detached from the jar; and Fig. 4, a plan view of Fig. 2.

The bottle A, Fig. 1, has an external screw-thread on the neck below the mouth, and a screw-ring, $b$, of metal, adapted to the threaded portion of the bottle, is attached to or forms part of the handle B, the ring being, by preference, furnished with a spout, $n$. While this plan may be adopted in connection with screw-neck bottles of a comparatively small size, I prefer the construction shown in Fig. 2 in applying my invention to heavier vessels, such as fruit-jars.

It is becoming a common practice to send milk from country dairies to cities in fruit-jars provided with caps and with rings for confining the caps, the fastening being sealed at the dairies and the jar being opened by the purchaser, who can remove the ordinary screw-ring and cap, and by attaching the handle shown to the jar convert it into a milk-jug, the handle being detached when the jug is empty, and the temporarily-discarded screw-ring and cap being fitted to the jar prior to its return to the dairy. In this case the screw-ring $b$ attached to the handle has a flange adapted to the shoulder $w$ of the jar, and is furnished with internal projections adapted to be locked beneath the inclined projections $m$ on the jar. The ring is, in fact, a screw-ring, and substantially the same as the screw-rings with continuous threads adapted to continuous threads formed on jars of this class. In this case, also, the ring $b$ has a spout or lip, $n$, which facilitates the pouring out of the contents of the jar without spilling or dripping of the same.

The lower end of the handle B is furnished with a ring, $d$, which embraces the body of the jar, and serves to lessen the strain on the screw-ring $b$ when the jar is being tilted. A section of a ring adapted to embrace more than half of the body of the jar may be substituted for the complete ring in some cases.

If desired, the ring $b$ may be used to secure to the mouth of the jar a light cap of glass or sheet metal, which will prevent the contents of the jar from becoming deteriorated by contact with the air during the time that the jar is not in use.

I claim as my invention—

1. The combination of a handle, B, with a screw-ring, $b$, secured to or forming part of said handle, and adapted to the threaded neck of a bottle or jar, substantially as described.

2. A handle provided at its upper end with a threaded ring, $b$, adapted for application to the threaded neck of a jar or bottle, and with a ring or section of a ring, $d$, adapted to the body of the jar or bottle, all substantially as specified.

3. The combination, substantially as described, of a screw-ring adapted to the threaded portion of a bottle or jar, with a handle and spout forming part of or attached to the said screw-ring, as set forth.

In testimony whereof I have signed my name to this specification in the presence of two subscribing witnesses.

J. CHESTON MORRIS.

Witnesses:
HARRY DRURY,
HARRY SMITH.